United States Patent
Matsui

(10) Patent No.: US 7,465,100 B2
(45) Date of Patent: Dec. 16, 2008

(54) SEALING APPARATUS

(75) Inventor: Hiroki Matsui, Fukushima (JP)

(73) Assignee: Nok Corporation, Tokyo (JP)

( * ) Notice: Subject to any disclaimer, the term of this patent is extended or adjusted under 35 U.S.C. 154(b) by 0 days.

(21) Appl. No.: 11/785,833

(22) Filed: Apr. 20, 2007

(65) Prior Publication Data

US 2007/0197302 A1 Aug. 23, 2007

Related U.S. Application Data

(62) Division of application No. 10/527,027, filed as application No. PCT/JP03/11434 on Sep. 8, 2003, now abandoned.

(30) Foreign Application Priority Data

Sep. 9, 2002 (JP) .............................. 2002-262620

(51) Int. Cl.
F16C 33/76 (2006.01)
F16J 15/32 (2006.01)
F16D 3/00 (2006.01)

(52) U.S. Cl. ...................... 384/486; 384/484; 277/549; 277/560; 464/131

(58) Field of Classification Search ......... 384/484–486; 464/14, 131; 277/353, 436, 549, 559–562, 277/568

See application file for complete search history.

(56) References Cited

U.S. PATENT DOCUMENTS

| | | | | |
|---|---|---|---|---|
| 3,200,615 A * | 8/1965 | Stokely | ...................... | 464/131 |
| 3,306,683 A | 2/1967 | Deuring | ...................... | 308/187 |
| 3,455,564 A * | 7/1969 | Dega | ........................... | 277/559 |
| 4,427,206 A * | 1/1984 | Sugiyama | .................... | 277/568 |
| 5,026,324 A * | 6/1991 | Schurger et al. | ............ | 384/486 |
| 5,244,215 A * | 9/1993 | Cather et al. | ................. | 277/309 |
| 5,588,915 A * | 12/1996 | Smith | ........................... | 464/14 |
| 5,597,356 A * | 1/1997 | Rieder | ........................ | 384/486 |
| 6,050,899 A * | 4/2000 | Jones et al. | .................. | 464/131 |
| 6,520,506 B2 * | 2/2003 | Reinhardt et al. | ........... | 277/549 |
| 6,612,582 B2 * | 9/2003 | Hosoda | ....................... | 277/436 |
| 6,726,211 B1 * | 4/2004 | Kuroki et al. | ................ | 277/353 |
| 6,736,404 B1 * | 5/2004 | Shuster | ........................ | 277/559 |
| 6,997,461 B2 * | 2/2006 | Smith et al. | .................. | 277/549 |

FOREIGN PATENT DOCUMENTS

EP 493735 A1 * 7/1992

(Continued)

OTHER PUBLICATIONS

Patent Abstracts of Japan, vol. 1996, No. 3, Mar. 29, 1996 & JP 07301339A (NOK Corp).

*Primary Examiner*—Marcus Charles
(74) *Attorney, Agent, or Firm*—Jacobson Holman PLLC

(57) ABSTRACT

A sealing apparatus capable of increasing a grease resistance property, wherein the tip of a sealing lip is formed so that an inner side contact angle $\alpha$ is equal to an open-air side contact angle $\beta$ ($\alpha=\beta$), that is, formed in a triangular shape to prevent grease inside the apparatus from leaking so as to increase the grease resistance property, and since the extending direction of the sealing lip is set at a middle of an inner side and an open-air side, a trouble such as the inversion of the sealing lip due to the occurrence of an inner pressure does not occur.

1 Claim, 5 Drawing Sheets

FOREIGN PATENT DOCUMENTS

| | | | |
|---|---|---|---|
| EP | 1225355 A2 * | 7/2002 | |
| GB | 1210191 | 10/1970 | |
| GB | 1346250 | 2/1974 | |
| JP | 01026028 A * | 1/1989 | |
| JP | 2002-98163 A * | 4/2002 | |
| JP | 2002106594 A * | 4/2002 | |

* cited by examiner

SEALING APPARATUS

CROSS REFERENCE TO RELATED APPLICATIONS

This is a divisional application of application Ser. No. 10/527,027, filed Mar. 8, 2005, now abandoned which in turn is a U.S. stage application under 35 U.S.C. .371 of PCT/JP03/11434, filed Sep. 8, 2003 and published in Japanese.

TECHNICAL FIELD

The present invention relates to a sealing apparatus that is used, for example, for a propeller shaft (universal joint) of a driving transmission shaft for a vehicle or the like.

BACKGROUND ART

Conventionally, those applied as this type of sealing apparatus are described in patent document 1 (Japanese Patent Application Laid-open No. 11-125338) and patent document 2 (Japanese Patent Application Laid-open No. 2002-98163).

Particularly, as a specific example of one such as described in patent document 2, there is one shown in FIG. 5 (See FIG. 2 of patent document 2). FIG. 5 is a half sectional view of a sealing apparatus 101 according to a conventional art.

In FIG. 5, sealing apparatus 101 is arranged between a cap into which an end portion of a cross shaft is inserted and fitted and the end portion of the cross shaft.

Sealing apparatus 101 has an attachment portion 102 attached to the cap. A metal ring 103 is integrally formed on the surface of attachment portion 102, and this metal ring 103 is press-fitted to the cap.

Then, a sealing lip 104 that extends from attachment portion 102 is slidably in sealing contact with the outer periphery of the cross shaft.

Also, on an open-air side A of sealing lip 104, double dust lips 105, 106 are slidably in contact with the outer periphery of the cross shaft.

The sealing lip 104 and dust lips 105, 106 extend from attachment portion 102 to the cross shaft on the inner side while being tilted to the open-air side A.

Here, the tip end of sealing lip 104 has an inner side contact angle a which is an angle smaller than an open-air side contact angle β (α<β), and is provided as a so-called outward-oriented lip.

The purpose of setting such a relationship of the contact angles of the outward-oriented lip is to prevent occurrence of lip inversion caused by generation of inner pressure and to allow the grease supplied to bearings on an inner side I to escape to the open-air side A.

DISCLOSURE OF THE INVENTION

However, the above-described conventional art causes decrease of the grease holding property (grease resistance property) though filling of grease can be confirmed by leakage of the grease from sealing lip 104.

The present invention has been made in view of the above-described conventional art, and an object thereof is to provide a sealing apparatus with improved grease resistance property.

In order to achieve the aforementioned object, the present invention comprises an attachment portion attached to one member of two members that are arranged to be relatively movable; a sealing lip extending from the attachment portion to the other member to be slidably in sealing contact with the other member; and a dust lip extending to the other member to be slidably in contact with the other member while being tilted toward the open-air side from said attachment portion on the open-air side of the sealing lip, wherein said sealing lip is provided to have an larger inner side contact angle which is an angle not smaller than an open-air side contact angle.

Therefore, the grease resistance property is improved because the sectional shape of the sealing lip prevents leakage of grease in the inside.

Here, the inner side contact angle refers to the angle that the tilted inner side surface of the lip cross-section forms with the axial direction from the inner side to the open-air side in which the contacting other member extends, and the open-air side contact angle refers to the angle that the tilted open-air side surface of the lip cross-section forms with the axial direction from the inner side to the open-air side in which the contacting other member extends.

It is preferable that said sealing lip has an extending direction that is tilted not less to the open-air side than the middle of the inner side and the open-air side.

This prevents occurrence of a defect such as lip inversion caused by generation of inner pressure because the extending direction of the sealing lip is at the middle of the inner side and the open-air side or tilted to the open-air side.

Here, the extending direction of the sealing lip being the middle of the inner side and the open-air side refers to the direction perpendicular to the axial direction which is directed from the inner side towards the open-air side.

It is preferable that said dust lip is a double seal having two parts.

This prevents penetration of dusts, whereby the sealing property can be enhanced to a greater extent.

It is preferable that said sealing lip has the inner side contact angle which is substantially equal to the open-air side contact angle, has the direction extending from the base being substantially at the middle of the inner side and the open-air side, and has a sectional shape which is symmetric relative to the line of the extending direction.

This enhances the rigidity of the sealing lip, restrains the fluctuation of the angles of the inner side contact angle and the open-air side contact angle caused by deformation of the sealing lip, and can stabilize the sealing property. Also, enhancement of the rigidity of the sealing lip further prevents occurrence of a defect such as inversion of the lip caused by generation of inner pressure.

In the present invention, since the sealing lip is provided to have a larger inner side contact angle which is an angle not smaller than the open-air side contact angle, the sectional shape of the sealing lip prevents leakage of grease in the inside, whereby the grease resistance property is improved.

Also, since the extending direction of the sealing lip is at the middle of the inner side and the open-air side or tilted to the open-air side, a defect such as lip inversion caused by generation of inner pressure does not occur.

BEST MODES FOR CARRYING OUT THE INVENTION

Hereafter, embodiments of this invention will be described in detail in an exemplifying manner with reference to the drawings. However, the dimension, material, and shape as well as the relative arrangement thereof of the constituent components described in this embodiment are not to limit the scope of this invention to them alone unless a specific description is given.

First Embodiment

Figure 1:
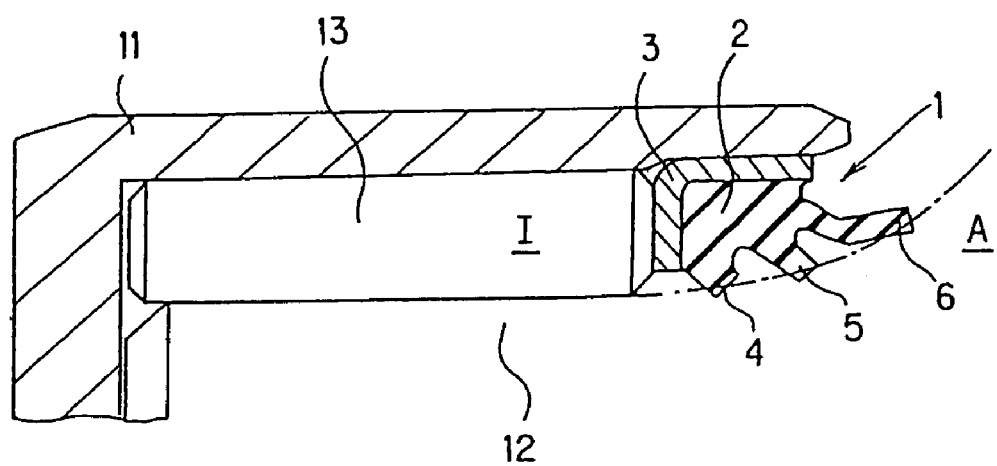
FIG. 1 is a half sectional view illustrating a sealing apparatus and a peripheral portion thereof according to a first embodiment.
Figure 2:
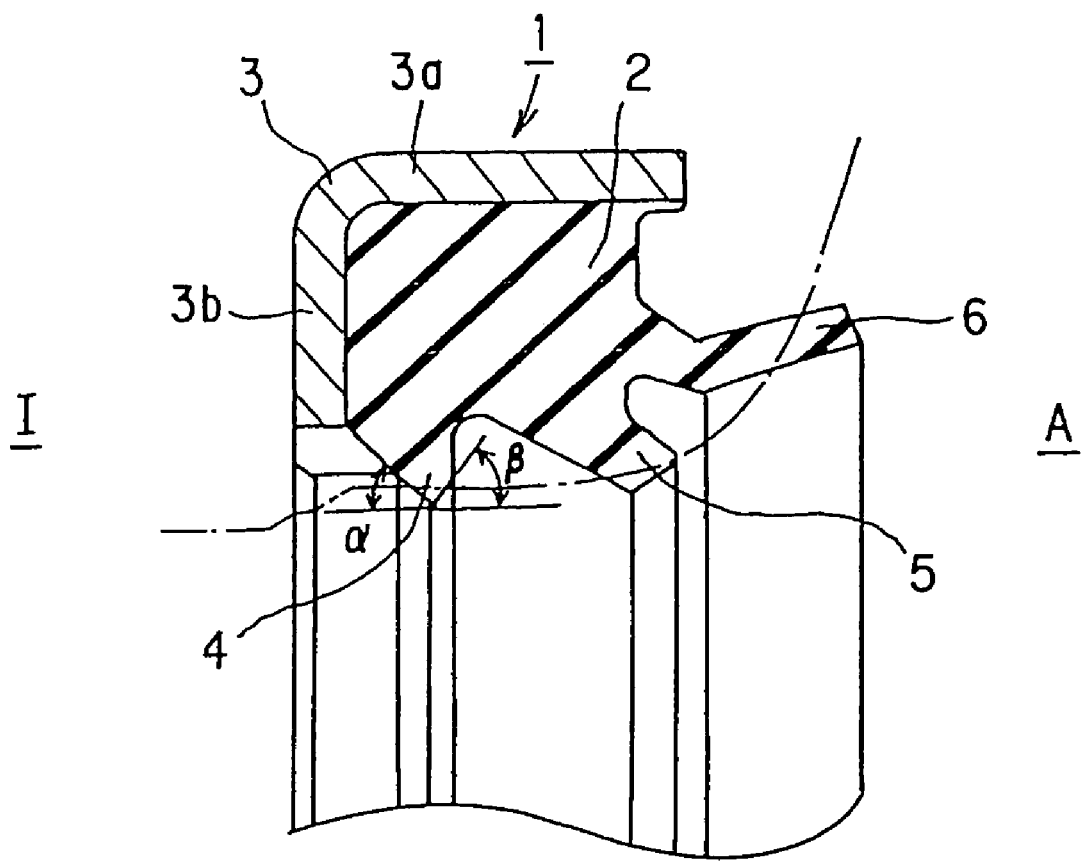
FIG. 2 is a half sectional view illustrating the sealing apparatus according to the first embodiment.

Hereafter, a first embodiment will be described with the use of FIGS. 1 to 2. FIG. 1 is a half sectional view illustrating a sealing apparatus 1 and a peripheral portion thereof according to the first embodiment. FIG. 2 is a half sectional view illustrating the sealing apparatus 1 according to the first embodiment.

In a propeller shaft (universal joint) of FIG. 1, an end portion of a cross shaft 12 is inserted and fitted to a cylindrical cap 11 having a bottom. A plurality of needle-shaped bearings 13 are rotatably arranged between the outer periphery of the end portion of cross shaft 12 and the inner periphery of cap 11.

Grease supply that supplies grease by providing a passageway in cross shaft 12 is carried out in this bearing 13.

Then, sealing apparatus 1 is arranged in an annular gap between the inner periphery of the open end portion of cap 11 and the outer periphery of cross shaft 12 with this bearing 13 side serving as an inner side I. Then, the side of sealing apparatus 1 opposite to the inner side I of the bearing 13 side is referred to as an open-air side A that is open to the outside of the apparatus.

Sealing apparatus 1 is attached to cap 11 and has a construction such that various lips are slidably in contact with cross shaft 12.

A specific construction of sealing apparatus 1 will be described. Sealing apparatus 1 is substantially made of rubber-like elastic substance or made of resin, and is constituted of an attachment portion 2, a sealing lip 4, and two dust lips 5, 6.

Attachment portion 2 is attached by integrally forming a metal ring 3 on the outer peripheral surface and the inner side I surface and metal ring 3 is fitted by press-fitting on the inner peripheral surface of the open end portion of cap 11.

Metal ring 3 is constituted of a cylindrical portion 3a that goes along the inner peripheral surface of the open end portion of cap 11 and an annular portion 3b that extends in the inner radius direction from the inner side end of cylindrical portion 3a. Annular portion 3b is adjacent to bearings 13 so as to guide the needle-shaped bearings 13.

Sealing lip 4 is the lip of the innermost side I of sealing apparatus 1, namely a lip on the side near to bearings 13, and extends to cross shaft 12 from attachment portion 2 in the middle direction of the inner side I and the open-air side A, namely in the direction perpendicular to the axial direction from the inner side I to the open-air side A, to be slidably in sealing contact with cross shaft 12.

Here, as illustrated by enlargement in FIG. 2, the tip end of sealing lip 4 has an inner side contact angle α being an angle equivalent to an open-air side contact angle β (α=β), and is provided as a so-called triangular lip.

The inner side contact angle α refers to the angle that the tip end of the tilted inner side I surface of the lip cross-section of sealing lip 4 forms with the axial direction from the inner side I to the open-air side A in which cross shaft 12 extends. The open-air side contact angle β refers to the angle that the tip end of the tilted open-air side A surface of the lip cross-section of sealing lip 4 forms with the axial direction from the inner side I to the open-air side A in which cross shaft 12 extends.

Two dust lips 5, 6 extend to cross shaft 12 while being tilted to the open-air side A from attachment portion 2 on the open-air side A of sealing lip 4 to be slidably in contact with cross shaft 12. Thus, since dust lips 5, 6 are a double seal having two parts, penetration of dusts can be prevented and the sealing property is enhanced to a greater extent.

In sealing apparatus 1 having the above-described construction, leakage of grease in the inside is prevented by the sectional shape of sealing lip 4 whose tip end is formed to be a triangular lip, so that the grease resistance property is improved.

Also, since the extending direction of sealing lip 4 is at the middle of the inner side I and the open-air side A, occurrence of a defect such as lip inversion caused by generation of inner pressure is prevented.

Second Embodiment

In the above-described first embodiment, description has been given on a case in which the inner side contact angle α is an angle equivalent to the open-air side contact angle β (α=β); however, the present invention is not limited to this, and similar effects can be displayed if it is satisfied that the inner side contact angle α is an angle not smaller than the open-air side contact angle β (α≧β).

Namely, in addition to the above-described embodiment, as the one that prevents occurrence of a defect such as lip inversion caused by generation of inner pressure, similar effects can be displayed if it is satisfied that the extending direction of sealing lip 4 is tilted not less to the open-air side A than the middle of the inner side I and the open-air side A.

Figure 3:
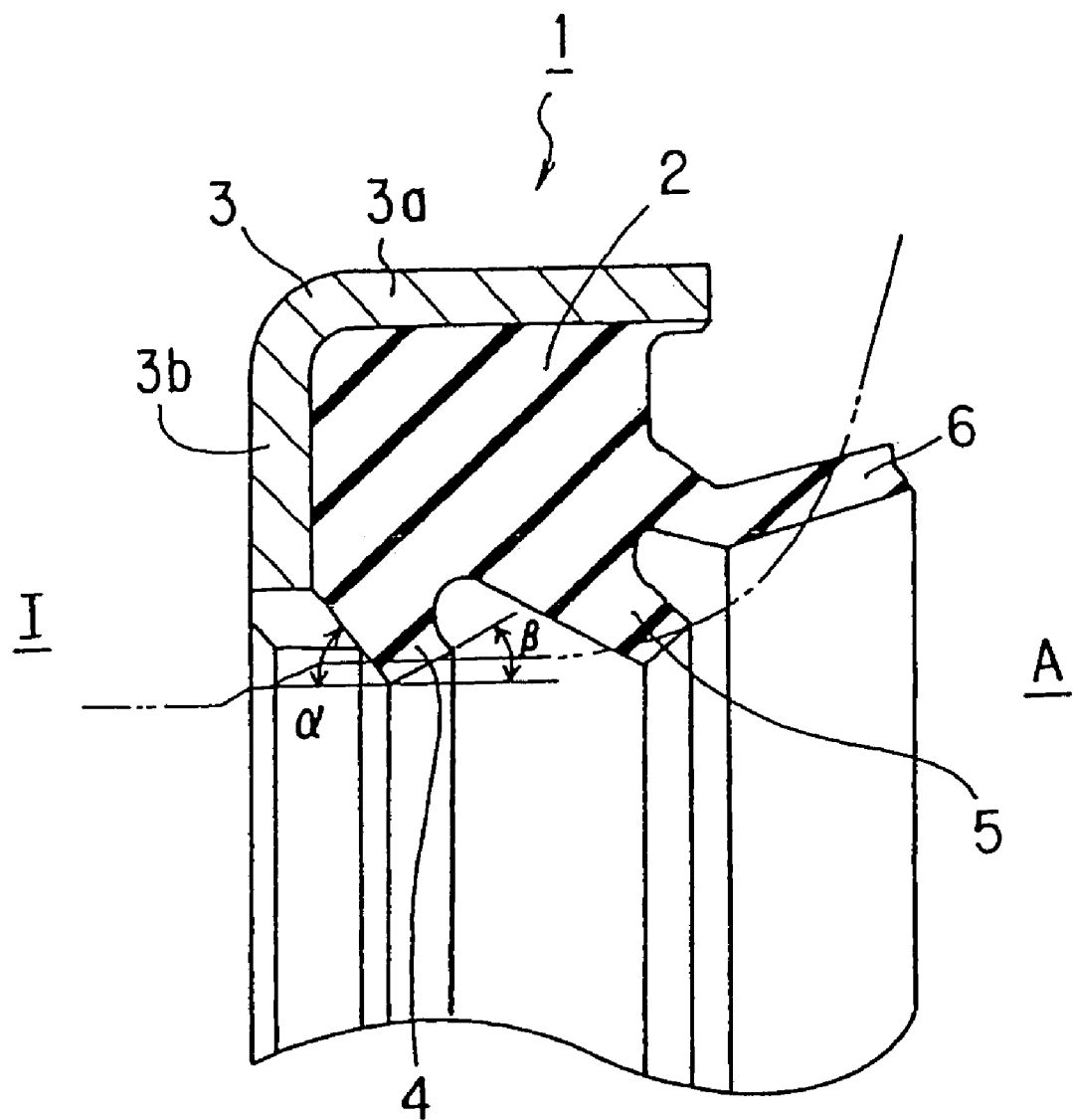
FIG. 3 is a half sectional view illustrating a sealing apparatus according to a second embodiment.

As a second embodiment, FIG. 3 illustrates one that is provided to be a so-called inverse offset lip in which the inner side contact angle α of the tip end of sealing lip 4 is an angle larger than the open-air side contact angle β (α>β). FIG. 3 is a half sectional view illustrating a sealing apparatus 1 according to the second embodiment. Here, in the second embodiment, the same constituents described in the above embodiment will be denoted with the same symbols, and the description thereof will be omitted.

In sealing apparatus 1 of FIG. 3, sealing lip 4 is tilted from attachment portion 2 to the open-air side A and extends to cross shaft 12 to be slidably in sealing contact with cross shaft 12.

Even with this sealing apparatus 1 having a construction of FIG. 3, the sectional shape of sealing lip 4 whose tip end is formed to be an inverse offset lip prevents leakage of grease in the inside, so that the grease resistance property is improved. Moreover, since it has a shape similar to a so-called inward-oriented lip, the grease resistance property is improved to a greater extent than with the sectional shape of sealing lip 4 of FIG. 2.

Also, since the extending direction of sealing lip 4 is tilted to the open-air side A, occurrence of a defect such as lip inversion caused by generation of inner pressure is prevented in the same manner as in FIG. 2.

Third Embodiment

In addition to the above-described embodiments, as the one that prevents occurrence of a defect such as lip inversion caused by generation of inner pressure, further effects can be displayed if it is satisfied that the inner side contact angle α is equal to the open-air side contact angle β (α=β) and the direction of sealing lip 4 extending from a base is at the middle of the inner side I and the open-air side A.

Figure 4:
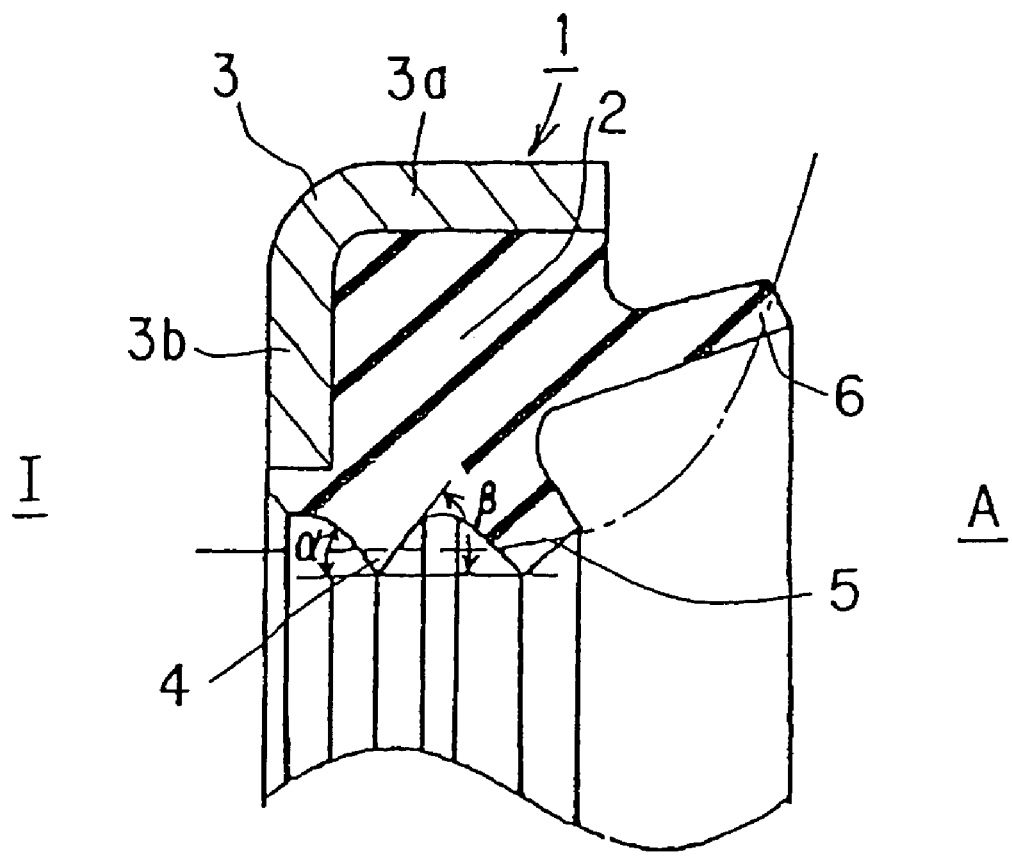
FIG. 4 is a half sectional view illustrating a sealing apparatus according to a third embodiment.
Figure 5:
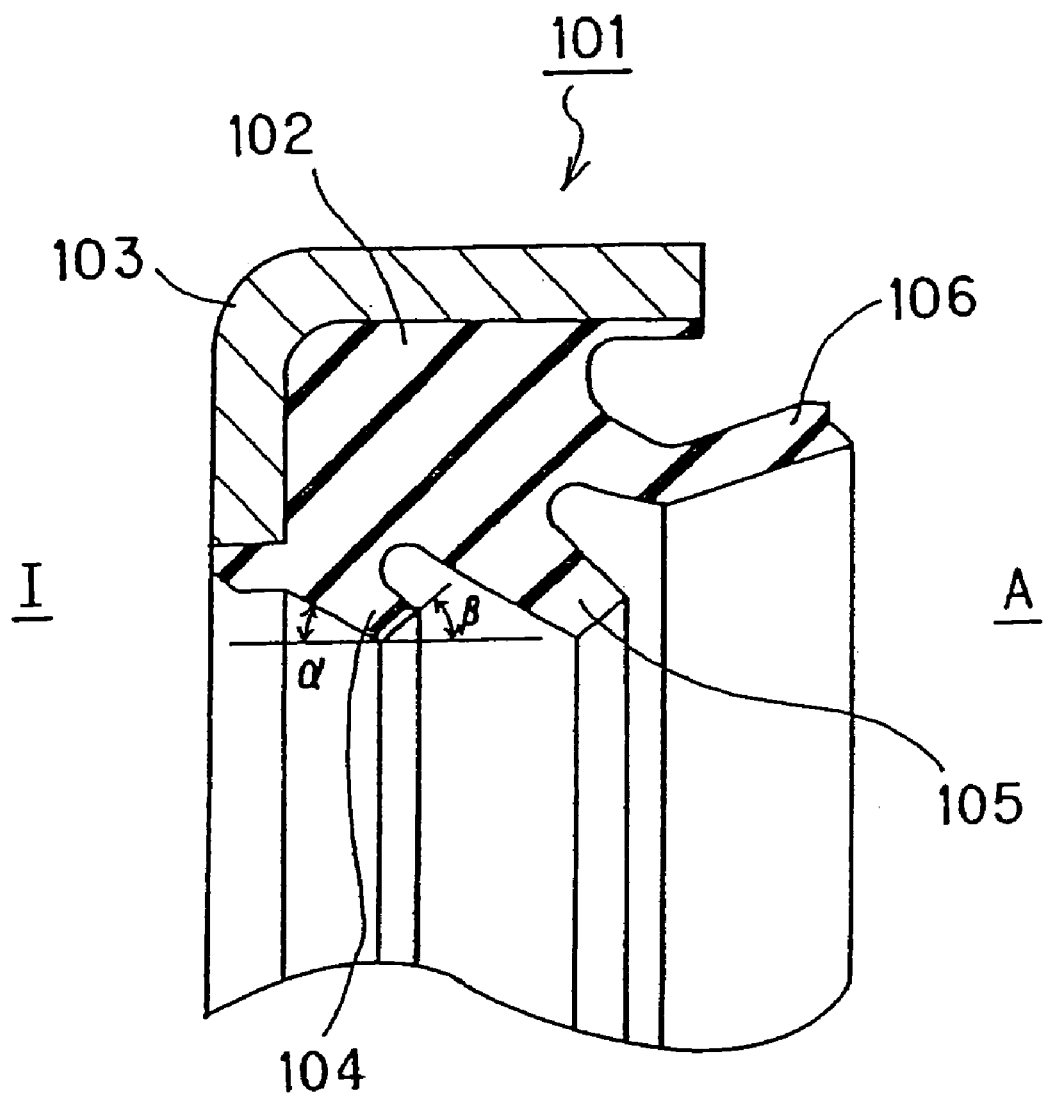
FIG. 5 is a half sectional view illustrating a sealing apparatus of a conventional art.

As a third embodiment, FIG. 4 illustrates one in which the inner side contact angle α and the open-air side contact angle β of sealing lip 4 are the same angle (α=β), and sealing lip 4 extends to the tip end from the base connected to attachment portion 2 so as to be provided as a so-called triangular lip from the base. FIG. 4 is a half sectional view illustrating a sealing apparatus 1 according to the third embodiment. Here, in the third embodiment, the same constituents described in the above embodiments will be denoted with the same symbols, and the description thereof will be omitted.

In sealing apparatus 1 of FIG. 4, sealing lip 4 extends from the base to cross shaft 12 in the middle direction of the inner side I and the open-air side A so as to be slidably in sealing contact with cross shaft 12.

Namely, sealing lip 4 has an inner side contact angle α being equal to an open-air side contact angle β, has a direction extending from the base being the middle of the inner side I and the open-air side A, and has a sectional shape of a triangular lip which is symmetric relative to the line of this middle direction.

With this sealing apparatus 1 having a construction of FIG. 4, the sectional shape of sealing lip 4 formed to be a triangular lip from the base prevents leakage of grease in the inside, so that the grease resistance property is improved.

Also, since the extending direction of sealing lip 4 is at the middle of the inner side I and the open-air side A, occurrence of a defect such as lip inversion caused by generation of inner pressure is prevented.

In addition, the total shape of the sealing lip 4 such as illustrated in FIG. 4 enhances the rigidity of sealing lip 4, restrains the fluctuation of the angles of the inner side contact angle α and the open-air side contact angle β caused by deformation of sealing lip 4, and can stabilize the sealing property. Also, enhancement of the rigidity of sealing lip 4 further prevents occurrence of a defect such as inversion of the lip caused by generation of inner pressure.

The invention claimed is:

1. A mechanical apparatus comprising
a cross shaft,
a cap,
an end portion of the cross shaft being inserted and fitted to the cap,
a plurality of needle-shaped bearings rotatably arranged between an outer periphery of the end portion of the cross shaft and an inner periphery of the cap, and said plurality of needle-shaped bearings being supplied with grease by a passageway defined by the cross shaft, and
a sealing device arranged in an annular gap between an inner periphery of an open end portion of the cap and the outer periphery of the cross shaft, and said sealing device being located adjacent to the plurality of needle-shaped bearings,
the sealing device including
an attachment portion including a metal ring having a cylindrical portion extending along an inner peripheral surface of the open end portion of the cap and an annular portion extending radially inwardly from an inner side end of the cylindrical portion and being located adjacent to the plurality of needle-shaped bearings so as to guide the plurality of needle-shaped bearings, and said attachment portion being attached to the cap by press-fitting the cylindrical portion of the metal ring on the inner peripheral surface of the open end portion of the cap;
a sealing lip having an extending direction from the attachment portion to the cross shaft so as to be slidably in sealing contact with the cross shaft; and
a dust lip extending from the attachment portion to the cross shaft to be slidably in contact with the cross shaft while being tilted toward an open-air side from said attachment portion on the open-air side of the sealing lip,
said sealing lip having an inner side contact angle not smaller than an open-air side contact angle,
said sealing lip having the inner side contact angle substantially equal to the open-air side contact angle, and the extending direction of the sealing lip being substantially located in a middle between an inner side and the open-air side, and the sealing lip having a sectional shape symmetric relative to a line of the extending direction.

* * * * *